United States Patent
Steidl et al.

(10) Patent No.: US 12,510,131 B2
(45) Date of Patent: Dec. 30, 2025

(54) TORSIONAL VIBRATION DAMPER

(71) Applicant: Hasse & Wrede GmbH, Berlin (DE)

(72) Inventors: Michael Steidl, Berlin (DE); Stephan Bohmeyer, Hoppegarten (DE)

( * ) Notice: Subject to any disclaimer, the term of this patent is extended or adjusted under 35 U.S.C. 154(b) by 330 days.

(21) Appl. No.: 18/014,205

(22) PCT Filed: Jul. 7, 2021

(86) PCT No.: PCT/EP2021/068850
§ 371 (c)(1),
(2) Date: Jan. 3, 2023

(87) PCT Pub. No.: WO2022/008600
PCT Pub. Date: Jan. 13, 2022

(65) Prior Publication Data
US 2023/0258243 A1 Aug. 17, 2023

(30) Foreign Application Priority Data
Jul. 8, 2020 (DE) ..................... 10 2020 118 066.7

(51) Int. Cl.
*F16F 15/16* (2006.01)
*F16F 15/14* (2006.01)
*F16F 15/167* (2006.01)

(52) U.S. Cl.
CPC ........ *F16F 15/165* (2013.01); *F16F 15/1457* (2013.01); *F16F 15/167* (2013.01);
(Continued)

(58) Field of Classification Search
CPC ............................. F16F 15/165; F16F 15/167
See application file for complete search history.

(56) References Cited

U.S. PATENT DOCUMENTS

| 3,398,602 A | 8/1968 | Croset |
| 5,139,120 A | 8/1992 | Gomi |

(Continued)

FOREIGN PATENT DOCUMENTS

| CN | 103899701 A | 7/2014 |
| CN | 104279266 A | 1/2015 |

(Continued)

OTHER PUBLICATIONS

International Search Report (PCT/ISA/210) issued in PCT Application No. PCT/EP2021/068850 dated Oct. 27, 2021 with English translation (four (4) pages).

(Continued)

*Primary Examiner* — Melody M Burch
(74) *Attorney, Agent, or Firm* — Crowell & Moring LLP

(57) ABSTRACT

A torsional vibration damper has a hub part (primary mass) that is able to be fastened to a driveshaft of a motor, and an inertia ring (secondary mass) that surrounds the hub part in the radially outer region, wherein a fluid-filled gap and sealing devices, by which the escape of the fluid is intended to be avoided, are provided between the hub part and inertia ring. The sealing devices each have a first ring, tightly connected to the hub part, and each have a second ring, tightly connected to the inertia ring, and each have a sealing element made of an elastomer, which is connected in each case sealingly to the first ring on one side and in each case to the second ring on the other side. The damper is configured such that the respective sealing element has been vulcanized onto a respective external axial side of the first and second ring by fastening portions.

15 Claims, 9 Drawing Sheets

(52) U.S. Cl.
CPC ... *F16F 2222/08* (2013.01); *F16F 2224/0208* (2013.01); *F16F 2224/025* (2013.01); *F16F 2226/048* (2013.01); *F16F 2230/30* (2013.01); *F16F 2232/02* (2013.01)

(56) References Cited

U.S. PATENT DOCUMENTS

| | | | |
|---|---|---|---|
| 5,140,868 | A | 8/1992 | Mizuno et al. |
| 2019/0170213 | A1 | 6/2019 | Steidl et al. |

FOREIGN PATENT DOCUMENTS

| | | | | |
|---|---|---|---|---|
| CN | 104403252 | A | * 3/2015 | |
| CN | 109563902 | A | 4/2019 | |
| DE | 2117930 | A1 | 12/1971 | |
| DE | 40 39 633 | A1 | 6/1991 | |
| DE | 41 10 845 | A1 | 10/1991 | |
| DE | 102011122034 | A1 | * 6/2013 | ............ F16F 15/167 |
| GB | 1105292 | | 3/1968 | |
| GB | 1 312 941 | A | 4/1973 | |
| JP | H0544781 | A | * 2/1993 | |
| JP | 2008-57582 | A | 3/2008 | |
| JP | 2008-190614 | A | 8/2008 | |
| JP | 2011027128 | A | * 2/2011 | |
| WO | WO 2018/019729 | A1 | 2/2018 | |

OTHER PUBLICATIONS

German-language Written Opinion (PCT/ISA/237) issued in PCT Application No. PCT/EP2021/068850 dated Oct. 27, 2021 (five (5) pages).

German-language Office Action issued in German Application No. 10 2020 118 066.7 dated Jan. 26, 2021 (five (5) pages).

International Preliminary Report on Patentability (PCT/IB/338 & PCT/IB/373) issued in PCT Application No. PCT/EP2021/068850 dated Jan. 19, 2023, including English translation of document C2 (Japanese-language Written Opinion (PCT/ISA/237) filed on Jan. 3, 2023) (seven (7) pages).

First Office Action dated May 23, 2025 for Chinese Patent Application No. 202180048349.0.

\* cited by examiner

TORSIONAL VIBRATION DAMPER

BACKGROUND AND SUMMARY

The present invention relates to a torsional vibration damper having a hub part (primary mass) that is able to be fastened to a driveshaft of a motor, and an inertia ring (secondary mass) that surrounds the hub part in the radially outer region, wherein a fluid-filled gap and sealing devices, by means of which the escape of the fluid is intended to be avoided, are provided between the hub part and inertia ring.

A torsional vibration damper of the type in question is known from WO 2018/019729 A1.

U.S. Pat. No. 5,140,868 A describes a viscous and rubber-type torsion damper having a hub part, a pulley part and connecting elements for elastically connecting the hub part and the pulley part.

For the technological background, GB 11 05 292 A is also cited.

The known torsional vibration damper has an outwardly offset inertia ring, which distinguishes its design from constructions in which the inertia ring is mounted so as to be completely encapsulated in a separate housing.

A drawback of the latter constructions is that the mass of the housing is irrelevant for the function of the damper and the encapsulation of the inertia ring limits heat dissipation.

In the known torsional vibration dampers with an outwardly offset inertia ring, it is necessary to ensure that any escape of the fluid located between the hub part and the inertia ring is avoided.

In the construction of the type in question, the sealing devices each consist of a first ring, tightly connected to the hub part, and of a second ring, tightly connected to the inertia ring, and of a ring made of elastomer, which is connected sealingly to the first ring on one side and to the second ring on the other side.

Also described therein is a construction in which the ring produced from elastomer is simultaneously fastened or adheres both to radial faces and to axial faces, in particular edge regions of the rings. In that case, the respective elastomer ring extends as a whole obliquely with respect to the radial and to the axial direction.

The present invention is based on the object of providing a torsional vibration damper of this type with sealing devices that have been advantageously developed even further compared with the prior art.

This object is achieved in that the respective sealing element has been vulcanized onto a respective external axial side of the first and second ring by fastening portions.

As a result of such a construction, the drawbacks of the prior art are avoided, since no friction at all can occur between sealing elements and rotating parts of the torsional vibration damper. In addition, the sealing element can durably compensate for the relative movement between the inertia ring and the hub part.

In contrast to the prior art, the sealing elements are fastened on the external axial faces or axial sides and the lateral faces of each of the two rings and not to the internal faces, which for their part are attached to the inertia ring and to the hub part, respectively.

The respective external axial sides of the first and second ring face away from the inertia ring (secondary mass).

In this way, the space located internally between the rings is not impaired or reduced by the sealing elements. This results in a further advantage of achieving greater moments of inertia of the inertia ring. In addition, it is not necessary to provide the inertia ring with recesses in the region of the sealing element.

It is in particular advantageous that the respective sealing element has also been vulcanized onto a respective radial side of an outside diameter of the first ring and onto a respective radial side of an inside diameter of the second ring, since in this way each fastening portion of the respective sealing element surrounds external edge regions of the axial sides and lateral faces of the respective ring, with the result that an improved hold and good sealing are achieved.

The term "radial side" means an encircling lateral face with the associated diameter of the respective ring, said lateral face forming a cylindrical annular disk with a circular cross section with an outside diameter and an inside diameter.

Moreover, it is in this case advantageous that the outside diameter of the first ring is smaller than the inside diameter of the second ring, since expansions in operation are minimized and as a result the durability is increased.

In addition, it is also advantageous when a sealing portion of the respective annular sealing element extends obliquely at an angle to the axial direction of an axis of rotation of the torsional vibration damper and has a value of between 15° and 50°.

Such a sealing connection in two directions on the primary mass and/or on the secondary mass forms in each case a particularly secure and long-lasting connection. As a result, a particularly well-defined state of the gap in continuous use can also be ensured in each case.

The first and second rings, tightly connected respectively to the hub part and the inertia ring, are preferably made of metal.

In this case, it is advantageous when the outside diameter of the first ring is smaller than the inside diameter of the second ring, since expansions in operation are minimized and as a result the durability is increased.

Preferably, the respective ring made of elastomer of a sealing device is sealingly connected to the metal rings, fastened respectively to the hub part and to the inertia ring, by a rubber-metal connection produced during an elastomer crosslinking process.

Preferably, a high-temperature-resistant elastomer, for example EPDM or silicone material, is used as the elastomer between the respectively first and second rings of a sealing device. In the context of this document, "silicone material" means a material that contains or is a synthetic polymer in which silicon atoms are bonded via oxygen atoms.

The sealing element may consist of an inorganically filled silicone elastomer, wherein the content of the inorganic material is at least 30%.

This is particularly expedient because the cited materials are suitable even in high temperature ranges.

In addition, the material has little influence on the lifetime of silicone oil. Conversely, the material is resistant to the silicone oil and swells only slightly.

It is particularly advantageous that both the silicone oil in the torsional vibration damper and the sealing device with the elastomer strip of the last over the lifetime of the damper. By contrast, other materials would result in excessive degradation of the silicone oil, and pure silicone would swell excessively.

The respective sealing devices are, according to the construction, not sliding seals, and so secure and durable complete sealing is achieved.

The sealing devices do not need to be pressed in, resulting in the advantage that the sealing devices can be installed without stress. Thus, a defined state of the gap in the torsional vibration damper can be ensured, in particular when the inertia ring is mounted on plain bearings with respect to the hub part.

For advantageously exact maintaining of the gap width, the inertia ring can be mounted in a radially and/or axially defined manner on plain bearings with respect to the hub part.

Particularly good properties for mounting and fitting arise when the sealing element has an axial projection in the form of a lip. The integral formation and shape of the outwardly extending lip is advantageously allowed in a simple manner in that the sealing elements are not fastened on the external axial faces or axial sides of the first rings but also on the external axial faces or axial sides of the rings, i.e. on each of the two external axial sides.

It is additionally advantageous when the sealing element has a cover plate for additionally mechanically protecting the sealing device from damage. This may advantageously be a metal sheet that is attached to the first ring and is open radially outwardly, wherein a wall of the cover plate is arranged parallel to the sealing portion of the sealing element at a distance from the sealing portion.

The outwardly radial opening in the metal sheet allows dirt or particles that collect on the elastomer strip or the sealing element to be transported away.

Further features and advantages of the invention will become apparent from the further dependent claims and the following description of two exemplary embodiments of the invention.

DETAILED DESCRIPTION OF THE DRAWINGS

Figure 1:
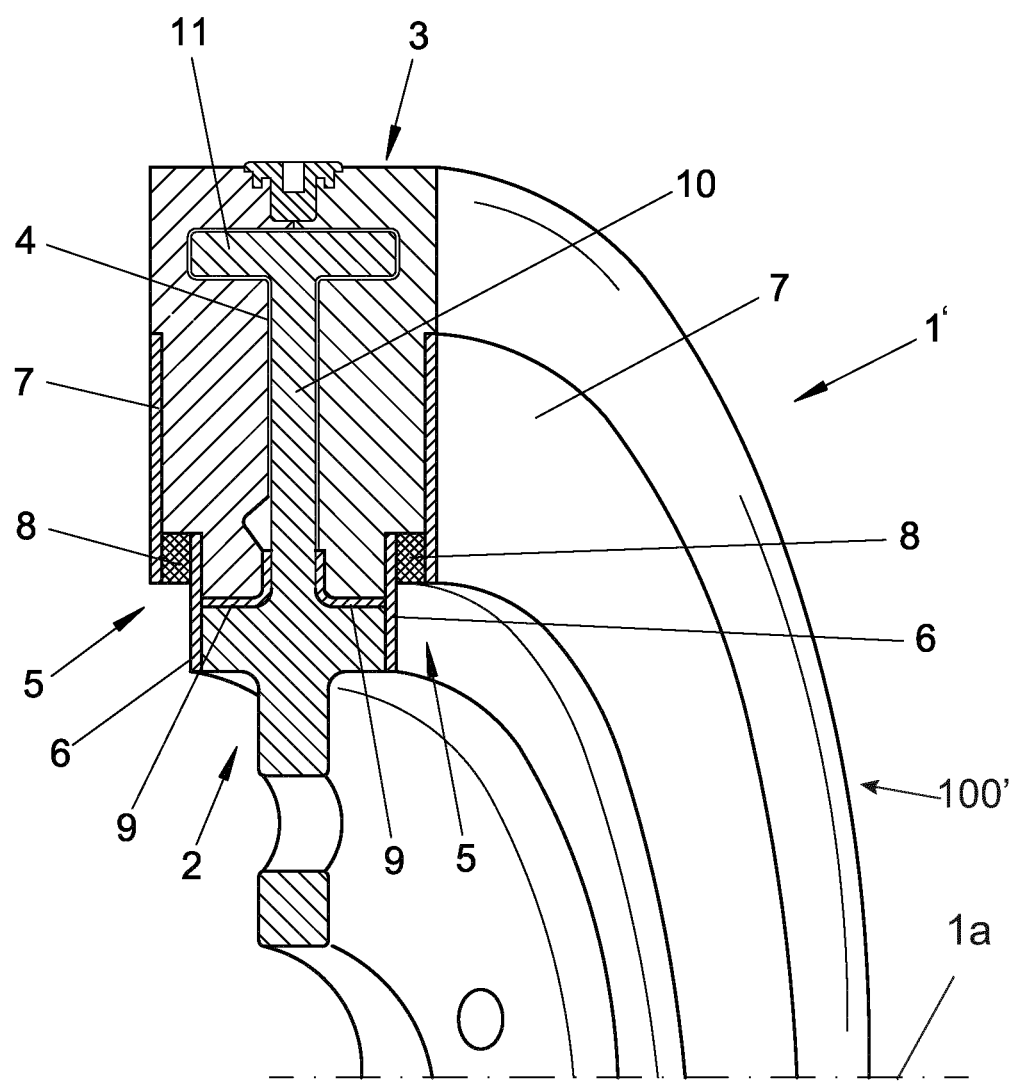
FIG. 1 is a schematic illustration in partial section of a torsional vibration damper according to the prior art.

FIG. 1 shows a torsional vibration damper 1' from the prior art, which the document WO 2018/019729 A1, to which reference is made herein, describes in detail with regard to the design and function of the torsional vibration damper 1.

The torsional vibration damper 1' having an axis of rotation 1a comprises a hub part 2 (primary part) that is able to be fastened to a driveshaft of a motor, an inertia ring 3 (secondary mass) that surrounds the hub part 2 in the radially outer region, wherein, between the hub part 2 and the inertia ring 3, there is a gap 4 which is filled with a fluid, preferably a silicone oil, and sealing devices 5 for sealing off the gap 4 toward the outside. The inertia ring is in this case an external inertia ring 3.

Each sealing device 5 respectively has a first ring 6, tightly connected to the hub part 2, and a second ring 7, tightly connected to the inertia ring 3, and a ring 8 made of elastomer, which is connected sealingly to the first ring 6 on one side and sealingly to the second ring 7 on the other side.

The rings 6, 7 consist preferably of metal and are firmly and tightly connected to the hub part 2 and the inertia ring 3, respectively, by a suitable connecting method, in particular screwing, welding, adhesive bonding, soldering or the like.

The respective ring 8 produced from elastomer, preferably from high-temperature-resistant elastomer, for example silicone material, is sealingly connected in an encircling manner to the first and second rings 6, 7 in the manner of a composite part. This connection is by a rubber-metal connection produced in particular during an elastomer crosslinking process.

The ring 6, ring 7 and ring 8 form an assembly, which is also referred to as a cover 100'. The torsional vibration damper 1' has two covers 100'.

In the prior art according to FIG. 1, the ring 8 made of elastomer has been vulcanized onto mutually adjoining faces of the first and second rings 6, 7, which overlap one another in a radial direction.

The inertia ring 3 is in this case mounted on plain bearings 9 with respect to the hub part 2, specifically both radially and axially, with the result that the size of the gap 4 is precisely defined.

The inertia ring 3 consists of at least two components, in order for it to be possible to mount this inertia ring 3 on the hub part 2. In this case, all previously known forms of construction and others are conceivable.

In the exemplary embodiments illustrated, the hub part 2 is provided with a radially outwardly protruding flange 10, which is completed in the outer peripheral region by a web 11 that extends in the axial direction and can extend on both sides of the flange 10, resulting in a T shape, but may also extend only toward one side of the flange 10, resulting in an L-shaped cross section. As a result of this geometry, the inertia ring 3 is fixed both in the radial direction and in the axial direction with respect to the hub part 2, wherein, as mentioned above, the size of the encircling gap 4 is always defined by the plain bearings 9.

Figure 2:
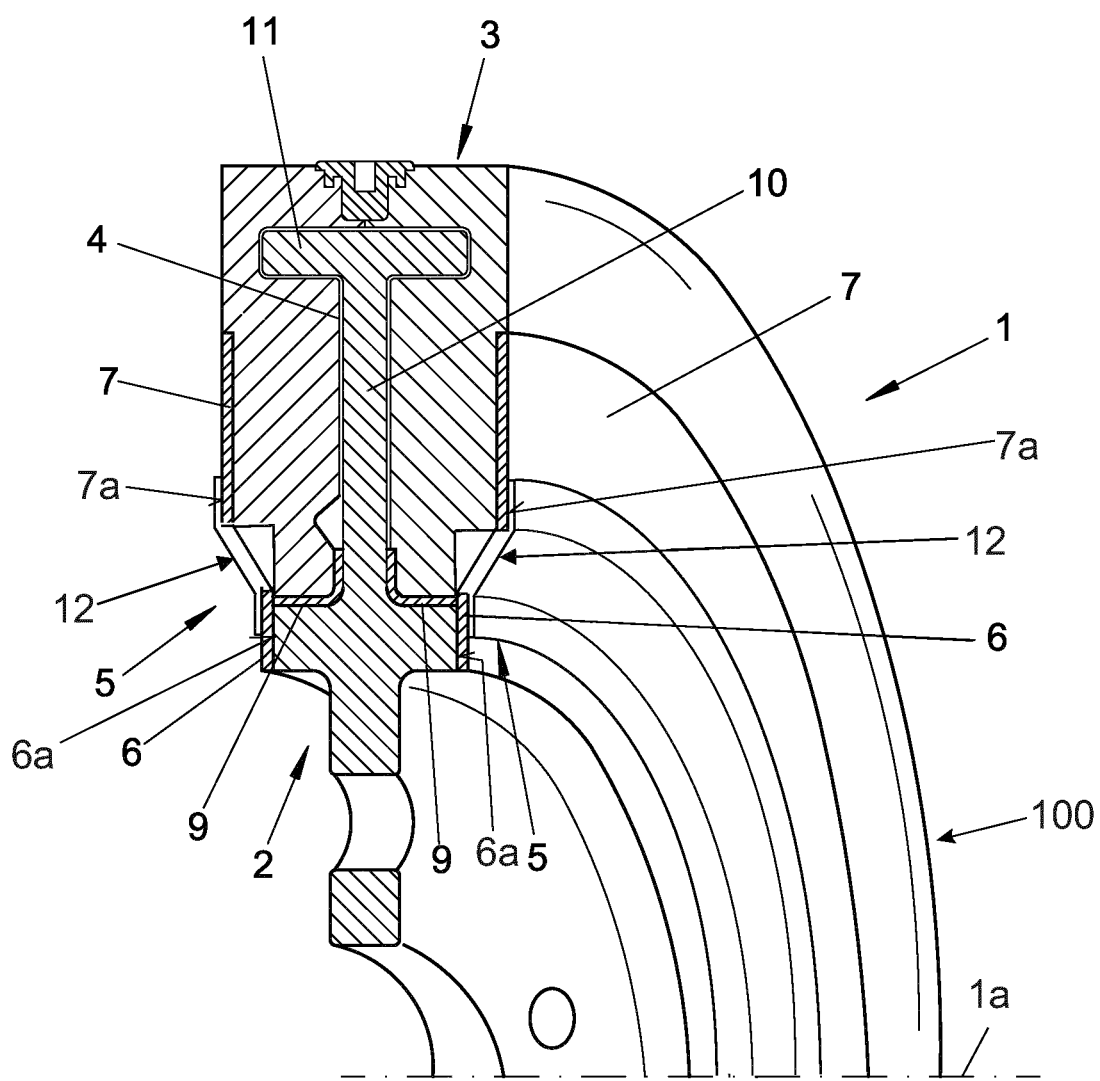
FIG. 2 is a schematic illustration in partial section of a torsional vibration damper according to an embodiment of the invention.

FIG. 2 illustrates an illustration in partial section of a torsional vibration damper 1 according to an embodiment of the invention.

The torsional vibration damper 1 differs from the above-described torsional vibration damper 1' of the prior art according to FIG. 1 by way of the sealing device 5.

By contrast, provision is made here that an annular sealing element 12 produced from elastomer rather than the ring 8 has been simultaneously vulcanized onto more extensive, external axial and radial edge regions 6a, 7a of the rings 6 and 7. The edge regions 6a, 7a are thus fastening faces for the sealing element 12. This will be described in more detail below.

Each sealing device 5 in this case also consists respectively of the first ring 6, tightly connected to the hub part 2, the second ring 7, likewise tightly connected to the inertia ring 3, and the annular sealing element 12 made of an elastomer, which is connected sealingly to the first ring 6 on one side and sealingly to the second ring 7 on the other side.

In contrast to the prior art according to FIG. 1, the first ring and the second ring 7 do not overlap a respective sealing device 5 in the radial direction. In this case, the outside diameter of the first ring 6 is smaller than the inside diameter of the second ring 7.

The respectively first and second rings 6, 7 of the respective sealing device 5 are in this case arranged in planes that are axially spaced apart from one another.

The respectively first and second rings 6, 7 of the respective sealing device 5 also consist in this case preferably of metal and are connected in an encircling manner, in particular tightly connected in an encircling manner, to the hub part 2 and the inertia ring 3 by a suitable connecting method.

The respective annular sealing element 12 produced from elastomer, preferably from high-temperature-resistant elastomer, for example silicone material, is sealingly connected, in particular sealingly connected in an encircling manner to the two first and second rings 6, 7 in the manner of a composite part. Preferably, the respective annular sealing element 12 made of elastomer of the respective sealing device 5 is sealingly connected to the metal rings 6, 7, fastened respectively to the hub part 2 and to the inertia ring 3, by a rubber-metal connection produced in particular during an elastomer crosslinking process.

This results in clean and durable sealing off of the gap region, wherein the use of high-temperature-resistant elastomers, for example silicone material, for the respective annular sealing elements 12 results in the advantage that these are also suitable in high temperature ranges.

It is particularly advantageous that the annular sealing element 12 produced from elastomer, preferably from silicone, has been vulcanized onto the edge regions 6a, 7a of the external axial faces, arranged in a mutually staggered manner, and onto mutually opposite radial faces of the first and second rings 6, 7. This will be described in more detail below.

The term "staggered" should be understood as meaning that these external axial faces, or the edge regions 6a, 7a thereof, are arranged one top of another in the radial direction and both face in the same direction, namely outward, wherein an inside diameter of the edge region 7a of the second ring 7 is larger than an outside diameter of the first ring 6.

In this case, too, the inertia ring 3 is advantageously mounted on plain bearings 9 with respect to the hub part 2, specifically both radially and axially, with the result that the size of the gap 4 is precisely defined.

In this way, covers 100 of the torsional vibration damper 1 are formed, which each have the first ring 6, the second ring 7 and the sealing element 12.

Figure 3:
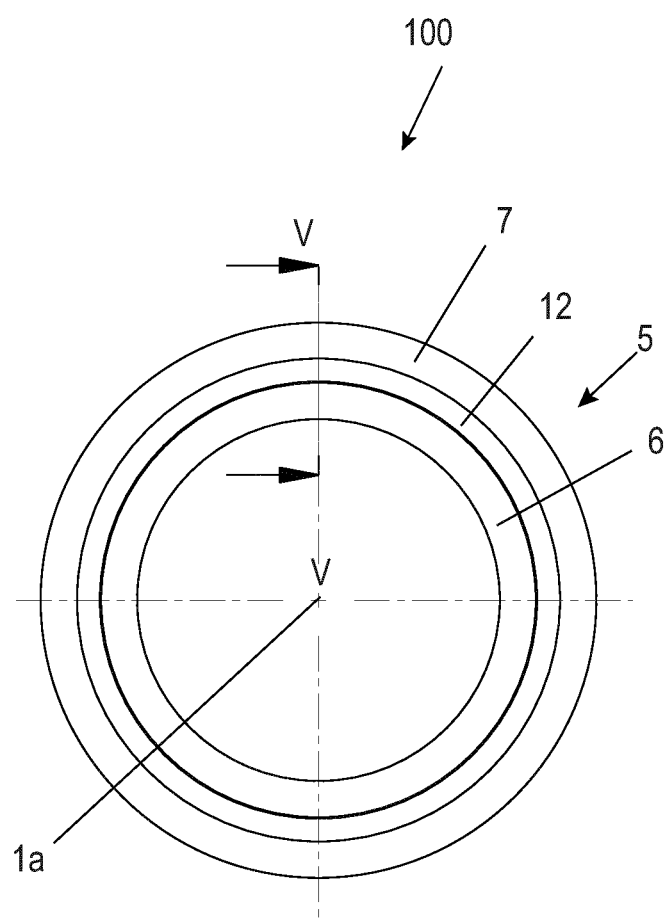
FIG. 3 is a schematic front view of a cover of the torsional vibration damper according to FIG. 2.
Figure 4:
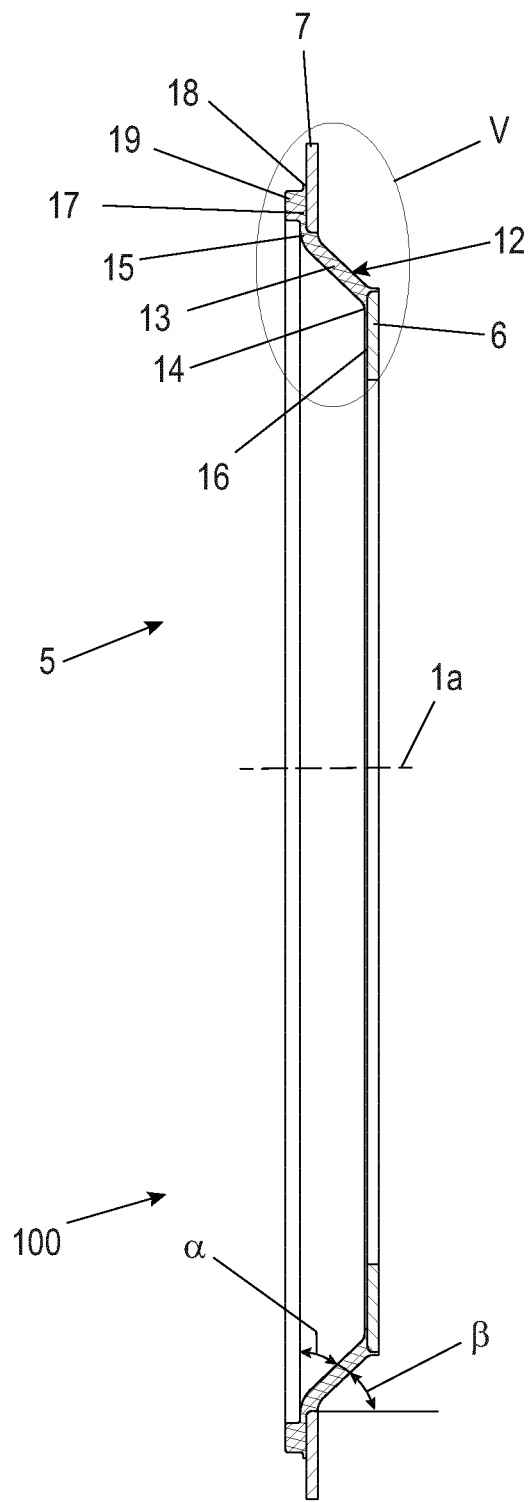
FIG. 4 is a schematic view in section of the cover according to FIG. 3.
Figure 5:
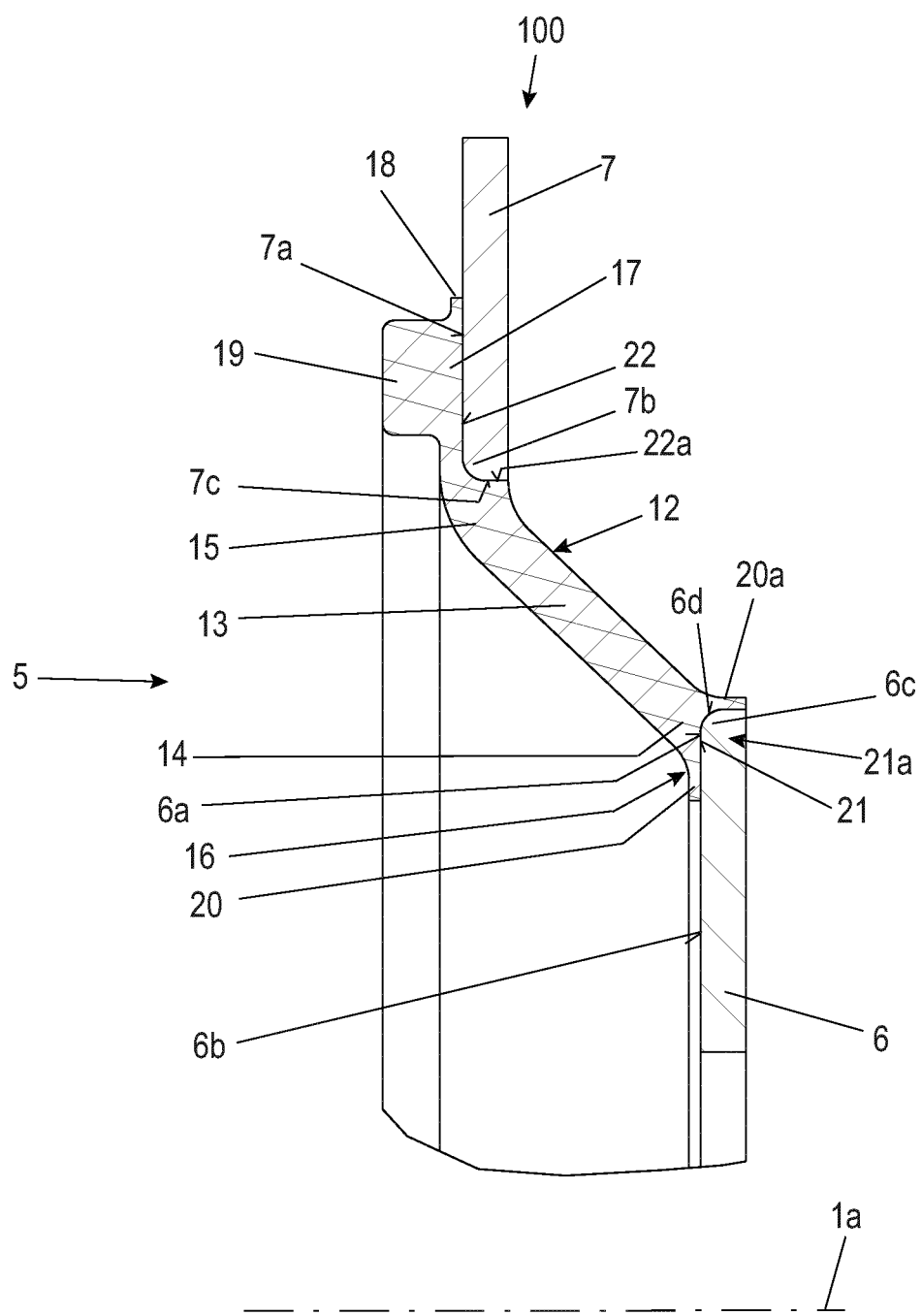
FIGS. 5-9 are enlarged schematic views in section of the region V from FIG. 3 and FIG. 4.

FIG. 3 shows in this regard a schematic front view of the cover 100 of the torsional vibration damper 1 according to FIG. 2. FIG. 4 illustrates a schematic view in section of the cover 100 according to FIG. 3. FIG. 5 shows an enlarged illustration of the region V-V of the cover 100 according to FIG. 3 and of the region V in FIG. 4.

A periphery of the outside diameter of the first ring 6 is arranged at a radial distance and at an axial distance from a periphery of the inside diameter of the second ring 7.

A sealing portion 13 of the respective annular sealing element 12 in this case extends as a whole obliquely with respect to the radial and to the axial direction and adheres in each case both to the external axial sides and the radial sides of the respective rings 6, 7.

The expression "obliquely with respect to the radial direction and to the axial direction" should be understood as meaning that the sealing portion 13 extends at an angle a to the radial direction, which is perpendicular to the axial direction of the axis of rotation 1a, and at an angle β to the axial direction of the axis of rotation 1a.

The external axial sides of the respective rings 6, 7 in this case have the edge regions 6a and 7a.

The term "external axial sides" means the respective sides or side faces of the rings 6, 7 of the two sealing devices 5, which face outward, and thus face away from the inertia ring 3 and, in contrast to internal sides, are connected neither to the inertia ring 3 nor to the hub part 2.

The term "radial sides" means the respective encircling radial lateral faces with the associated diameter of the respective ring 6, 7. The rings 6, 7 each form a cylindrical annular disk with a circular cross section with an outside diameter and an inside diameter.

This is explained in more detail below in connection with FIG. 5.

Provision is in this case advantageously made for the two rings 6, 7, that is to say the two metal rings of the sealing devices 5, to have different diameters (inside and outside) and for the sealing element 12 in the form of an elastomer ring to extend axially at the angle β, the value of which lies between 15 and 50°, in the manner an elastomer strip. The associated angle α with respect to the radial direction then has the value α–90°–β.

This results in very good durability of the sealing element 12 under high mechanical load. The influence of the material of the sealing element 12 on the lifetime of the silicone oil in the gap 4 is low. Moreover, the resistance of the material of the sealing element 12 to the silicone oil over the damper lifetime is likewise only low (little swelling).

The sealing element 12 comprises the encircling sealing portion 13 with transition portions 14, 15 and fastening portions 16, 17. This is most clearly apparent from the enlarged illustration in FIG. 5.

The sealing portion 13 is connected at its lower end to the first fastening portion 16 by the concave (with regard to the outer side) transition portion 14. The fastening portion 16 has, facing away from the second ring 7, an encircling recess 21, which is delimited axially by an encircling protrusion 20 extending in the radial direction and radially by a further encircling protrusion 20a extending in the axial direction.

The sealing element 12 has been vulcanized onto the axial side and the radial side of the outside diameter of the first ring 6 by the first fastening portion 16 such that the recess 21 surrounds the outer periphery of the first ring 6. In this case, the fastening portion 16 is connected by the radial protrusion 20 to the edge region 6a of the first ring 6 and by the axial protrusion 20a to the lateral face 6d of the outside diameter of the first ring 6.

A rounded portion 6c of the edge between the edge region 6a and the lateral face 6d of the first ring 6 is tightly surrounded by a corresponding portion in the form of a fillet 21a of the recess 21 of the sealing element 12.

Similarly, the sealing portion 13 is connected, at its upper end, to the second fastening portion 17 by the convex transition portion 15. The fastening portion 17 has, facing the second ring 7, a recess 22, which is delimited axially by a protrusion 18 extending in the radial direction and radially by an encircling fillet 22a.

The sealing element 12 has been vulcanized onto the axial side and the radial side of the inside diameter of the second ring 7 by the second fastening portion 17 such that the recess 22 surrounds the inner periphery of the second ring 7. In this case, the fastening portion 17 is connected by the radial protrusion 18 to the edge region 7a of the second ring 7 and by the fillet 22a to the lateral face 7d of the inside diameter of the second ring 7. A rounded portion 7b of the edge between the edge region 7a and the lateral face 7d of the second ring 7 is tightly surrounded by the corresponding fillet 22a of the recess 22 of the sealing element 12.

The fastening portion 17 has in this case an axial projection, which protrudes outwardly from the fastening portion 17. This projection is referred to here as a lip 19 and has a rectangular cross section with rounded edges. This integrated lip 19 prevents damage to the sealing element 12 during the construction of the torsional vibration damper 1, during transport and during fitting.

The integral formation and shape of the outwardly extending lip 19 is particularly simple and is allowed in a simple manner in that the sealing elements 12 are not fastened to the external axial faces or axial sides of the first ring 6 but also to those of the rings 7.

Figure 6:
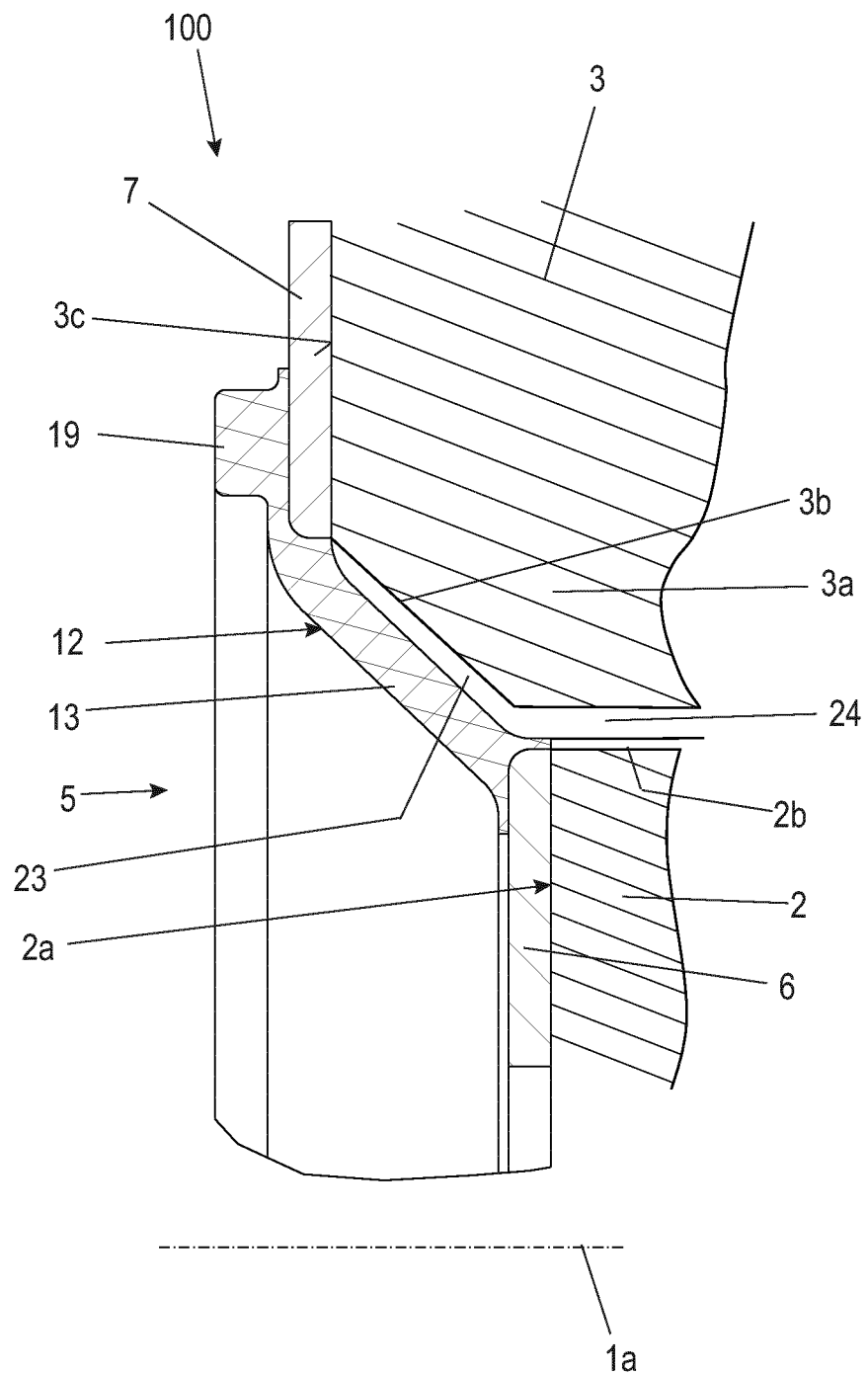
Figure 7:
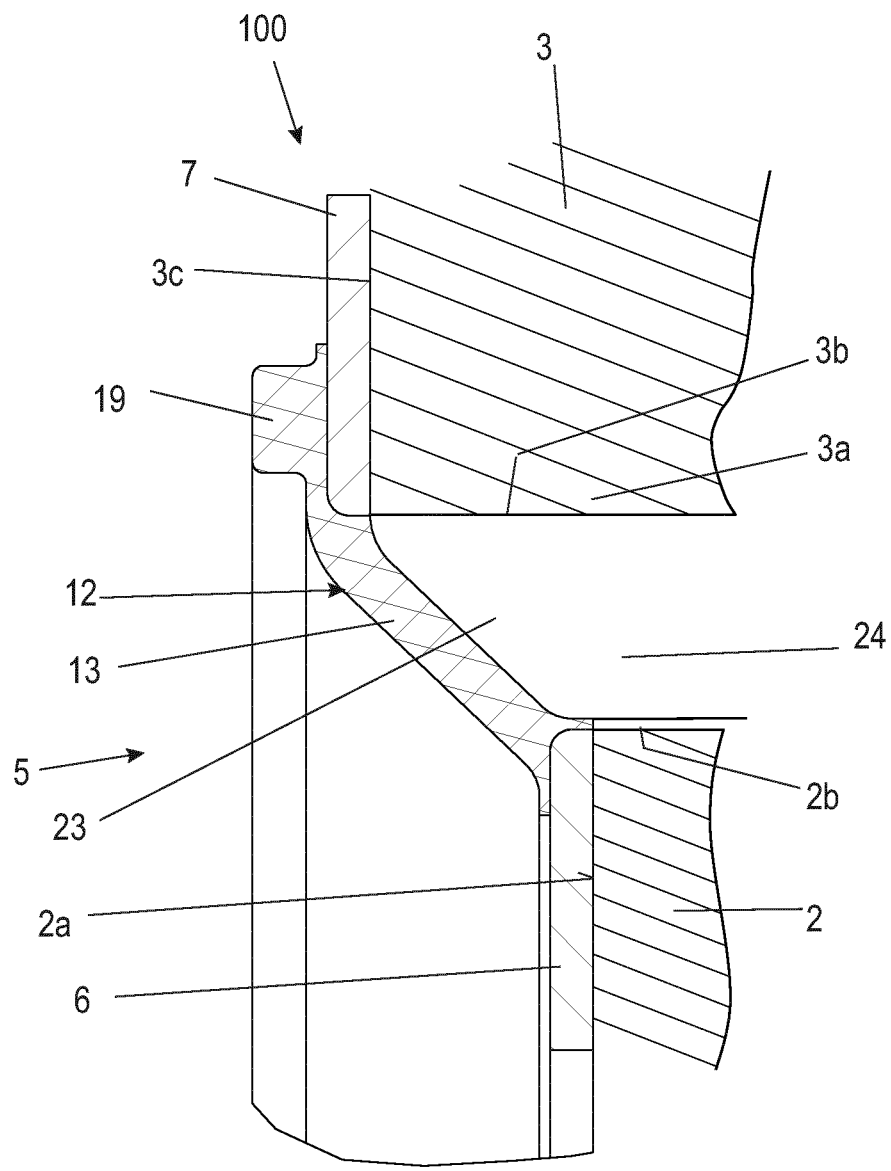
Figure 8:
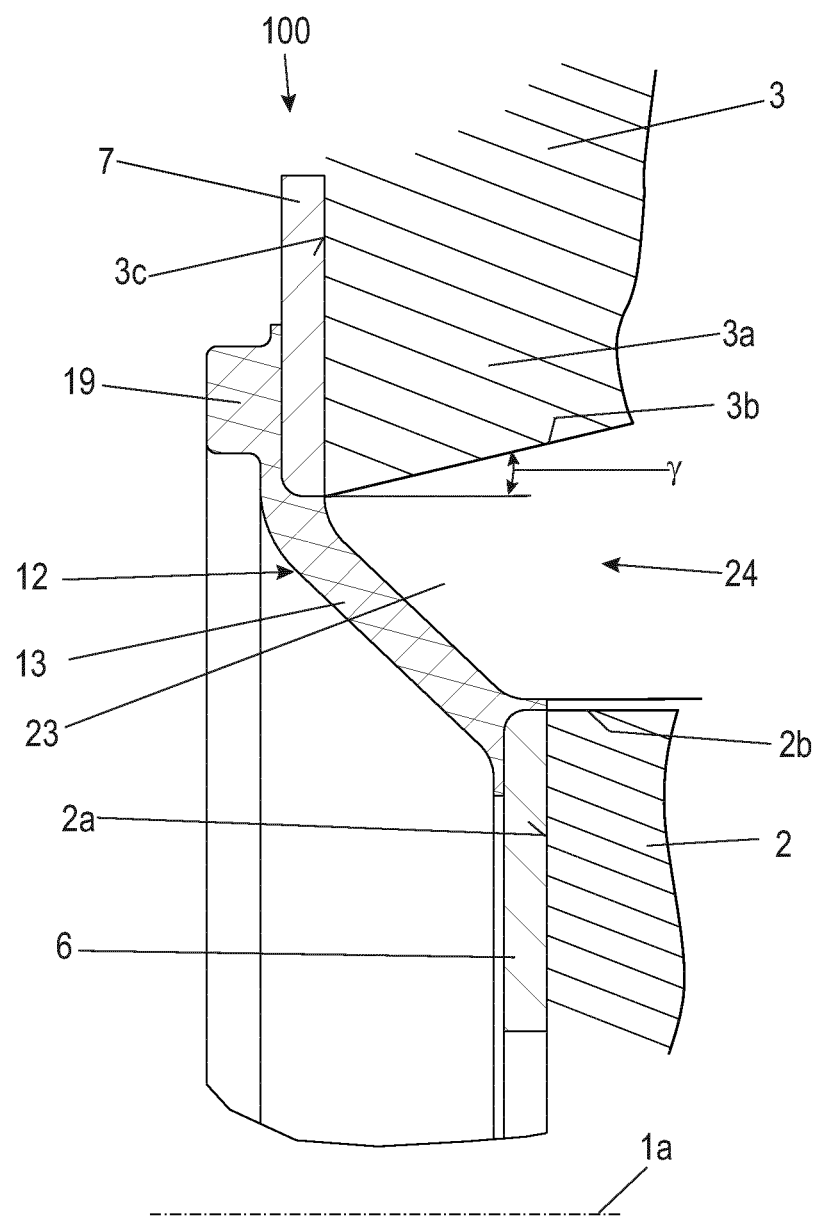

FIGS. 6 to 8 show further enlarged schematic views in section of the region V from FIG. 3 and FIG. 4 with three exemplary variants of the formation of the inertia ring 3 in the region of the sealing element 12. A plain bearing 9 is not shown here, but is conceivable.

Since the sealing elements 12 are fastened to the external axial faces or axial sides and to the lateral faces 6d, 7c of the rings 6, 7 and not to the internal faces, the space between the second rings 7 is not impaired or reduced by the sealing elements 12. This results in a further advantage of achieving greater moments of inertia of the inertia ring 3. In addition, it is not necessary to provide the inertia ring 3 with recesses in the region of the sealing element 12.

FIG. 6 shows the underside of the inertia ring 3 with an inner portion 3a. The inner portion 3a is in this case arranged at only a small distance from a periphery 2a of the hub part 2. An obliquely extending periphery 3b of the inner portion 3a of the inertia ring 3 extends approximately parallel to the likewise obliquely extending sealing portion 13 of the sealing element 12.

Defined between the sealing portion 13 of the sealing element 13 and the periphery 3b of the inner portion 3a of the inertia ring 3 is a small intermediate space 23, which communicates with a, likewise small, further intermediate space 24 between the inner portion 3a of the inertia ring 3 and the periphery of the hub part 2.

In FIG. 7, the periphery 3b of the inner portion 3a of the inertia ring 3 extends axially in continuation of the periphery of the inside diameter of the second ring 7 and parallel to the periphery 2b of the hub part 2 and to the axis of rotation 1a. In this case, a common, large intermediate space 23, 24 is formed between the peripheries 3b and 2b, which is closed toward the outside by the obliquely extending sealing portion 13 of the sealing element 12 (and likewise by the further sealing element 12 on the other side, which is not shown).

A further enlargement of the intermediate space 23, 24 is illustrated in FIG. 8. In this case, the periphery 3b of the inner portion 3a of the inertia ring 3 extends obliquely radially upward at an angle γ to a line parallel to the axis of rotation 1a.

The variants, shown in FIGS. 6 to 8, of the inertia ring allow different properties of the torsional vibration damper 1 with regard to the inertia and flow of the silicone oil.

Figure 9:
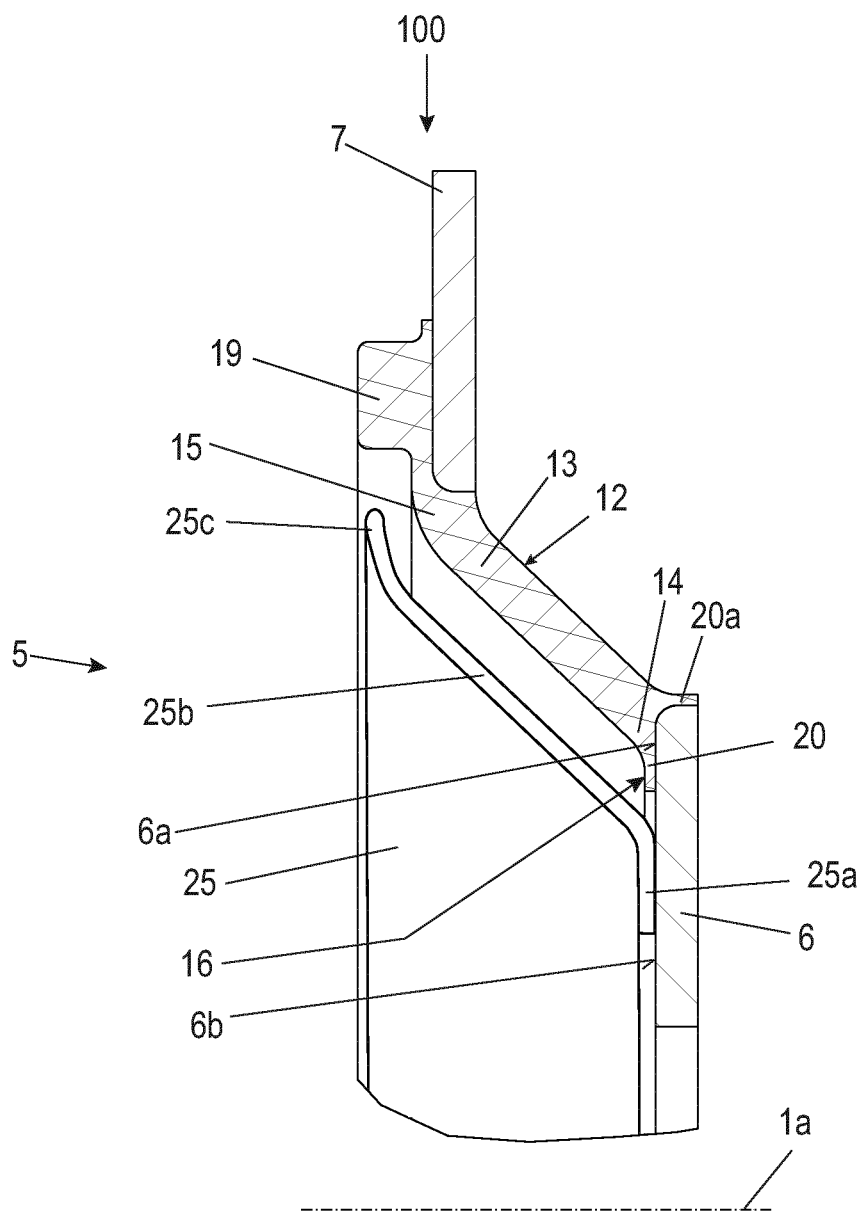

FIG. 9 shows yet another enlarged schematic view in section of the region V from FIG. 3 and FIG. 4 with a cover plate 25 for additionally mechanically protecting the sealing device 5 from damage.

This cover plate 25 can be realized for example by welding on an integrated metal sheet, wherein the metal sheet is radially open toward the outside, in order to allow dirt or particles that collect on the elastomer strip of the sealing device 5 to be transported away.

In this exemplary illustration, the cover plate 25 is in the form of a sheet-metal ring with a Z-like cross section. It has a radially extending fastening portion 25a, an obliquely extending wall 25b and a substantially again radially extending peripheral portion 25c.

By means of the fastening portion 25a, the cover plate is firmly and tightly attached, for example welded, to a fastening face 6b beneath the edge region 6a of the first ring 6.

In this case, the wall 25b extends approximately parallel to the sealing portion 13 of the sealing element 12 at a distance from the sealing portion 13. The peripheral portion 25c of the cover plate 25 extends here in a manner corresponding to the convex transition portion 15 of the sealing element 12 and defines with the latter a radial opening between the wall 25b and the sealing portion 13. Of course, other configurations are also possible; for example, the wall 25b may be shorter or longer or exhibit a different angle.

It should also be mentioned that the inertia ring 3 consists here of at least two components, in order for it to be possible to mount this inertia ring 3 on the hub part 2. In this case, all previously known forms of construction are conceivable.

The invention is not limited by the exemplary embodiment specified above, but can be modified within the scope of the claims.

LIST OF REFERENCE SIGNS 1, 1' Torsional vibration damper
1a Axis of rotation
2 Hub part
2a Fastening face
2b Periphery
3 Inertia ring
3a Inner portion
3b Periphery
3c Fastening face
4 Gap
5 Sealing device
6 Ring
6a Edge region
6b Fastening face
6c Rounded portion
6d Lateral face
7 Ring
7a Edge region
7b Rounded portion
7c Lateral face
8 Ring
9 Plain bearing
10 Flange
11 Web
12 Sealing element
13 Sealing portion
14, 15 Transition portion
16, 17 Fastening portion
18 Protrusion
19 Lip
20 Protrusion
21, 22 Recess
21a, 22a Fillet
23, 24 Intermediate space
25 Cover plate
25a Fastening portion
25b Wall
25c Peripheral portion
100, 100' Cover
α, β, γ Angles

The invention claimed is:

1. A torsional vibration damper for damping torsional vibrations, comprising:
   a hub part that is able to be fastened to a driveshaft of a motor;
   an inertia ring that surrounds the hub part in a radially outer region; and a fluid-filled gap and sealing devices, by which an escape of fluid is intended to be avoided, provided between the hub part and inertia ring, wherein each of the sealing devices has a first ring, tightly connected to the hub part, and a second ring, tightly connected to the inertia ring, and an annular sealing element comprising a circular ring element made of an elastomer with a central circular through hole, which is connected sealingly to the first ring and to the second ring, the sealing element of each sealing device has fastening portions that are vulcanized onto a respective external axial side surface of the first and the second ring, wherein the fastening portions comprise a first fastening section and a second fastening section, wherein the first fastening section is connected to the first ring, and the second fastening section is connected to the second ring, and wherein the second fastening section comprises an axial projection that protrudes outwardly and has a rectangular cross section with rounded edges, and the sealing element of each sealing device comprising two annular ring sections arranged in different axial planes relative to one another, each of which has a circular opening arranged coaxially, wherein the two annular ring sections are connected to one another via a connection section.

2. The torsional vibration damper as claimed in claim 1, wherein the respective external axial sides of the first and the second ring face away from the inertia ring.

3. The torsional vibration damper as claimed in claim 1, wherein the respective sealing element is also vulcanized onto a respective radial side of an outside diameter of the first ring and onto a respective radial side of an inside diameter of the second ring.

4. The torsional vibration damper as claimed in claim 3, wherein the outside diameter of the first ring is smaller than the inside diameter of the second ring.

5. A torsional vibration damper for damping torsional vibrations, comprising:
a hub part that is able to be fastened to a driveshaft of a motor;
an inertia ring that surrounds the hub part in a radially outer region; and
a fluid-filled gap and sealing devices, by which an escape of fluid is intended to be avoided, provided between the hub part and inertia ring, wherein
each of the sealing devices has a first ring, tightly connected to the hub part, and a second ring, tightly connected to the inertia ring, and an annular sealing element comprising a circular ring element made of an elastomer with a central circular through hole, which is connected sealingly to the first ring and to the second ring,
the sealing element of each sealing device has fastening portions that are vulcanized onto a respective external axial side of the first and the second ring, wherein the fastening portions comprise a first fastening section and a second fastening section, wherein the first fastening section is connected to the first ring, and the second fastening section is connected to the second ring, and wherein the second fastening section comprises an axial projection that protrudes outwardly and has a rectangular cross section with rounded edges,
wherein a sealing portion of the respective annular sealing element extends obliquely at an angle to an axial direction of an axis of rotation of the torsional vibration damper and has an angular value of between 15° and 50°, and
wherein the sealing element of each sealing device comprising two annular ring sections arranged in different axial planes relative to one another, each of which has a circular opening arranged coaxially, wherein the two annular ring sections are connected to one another via a connection section.

6. The torsional vibration damper as claimed in claim 1, wherein the first and the second rings, connected respectively to the hub part and the inertia ring, of the sealing devices are made of metal.

7. The torsional vibration damper as claimed in claim 6, wherein the sealing element or elements, made of the elastomer, of the sealing device is/are sealingly connected to the metal first and second rings fastened respectively to the hub part and to the inertia ring, by a rubber-metal connection produced during an elastomer crosslinking process.

8. The torsional vibration damper as claimed in claim 1, wherein the sealing element made of elastomer between the respective first and second rings of the at least one sealing device is made of a high-temperature-resistant elastomer.

9. The torsional vibration damper as claimed in claim 8, wherein the high-temperature-resistant elastomer is a silicone material.

10. A torsional vibration damper for damping torsional vibrations, comprising:
a hub part that is able to be fastened to a driveshaft of a motor;
an inertia ring that surrounds the hub part in a radially outer region; and
a fluid-filled gap and sealing devices, by which an escape of fluid is intended to be avoided, provided between the hub part and inertia ring, wherein
each of the sealing devices has a first ring, tightly connected to the hub part, and a second ring, tightly connected to the inertia ring, and an annular sealing element comprising a circular ring element made of an elastomer with a central circular through hole, which is connected sealingly to the first ring and to the second ring, and
the sealing element of each sealing device has fastening portions that are vulcanized onto a respective external axial side of the first and the second ring, wherein the fastening portions comprise a first fastening section and a second fastening section, wherein the first fastening section is connected to the first ring, and the second fastening section is connected to the second ring, and wherein the second fastening section comprises an axial projection that protrudes outwardly and has a rectangular cross section with rounded edges;
wherein the sealing element made of elastomer between the respective first and second rings of the at least one sealing device is made of a high-temperature-resistant elastomer,
wherein the high-temperature-resistant elastomer is a silicone material;
wherein the sealing element is made of an inorganically filled silicone elastomer, wherein a content of the inorganic material by percentage is at least 30%; and
wherein the sealing element of each sealing device comprising two annular ring sections arranged in different axial planes relative to one another, each of which has a circular opening arranged coaxially, wherein the two annular ring sections are connected to one another via a connection section.

11. The torsional vibration damper as claimed in claim 1, wherein the inertia ring is mounted in a radially and/or axially defined manner on plain bearings with respect to the hub part.

12. The torsional vibration damper as claimed in claim 1, wherein the sealing element has an axially outwardly protruding projection in the form of a lip.

13. The torsional vibration damper as claimed in claim 12, wherein the lip is integrally formed on the fastening portion of the sealing element, by which the sealing element is fastened to the external axial side of the second ring.

14. The torsional vibration damper as claimed in claim 1, wherein the sealing element has a cover plate for mechanically protecting the sealing device from damage.

15. The torsional vibration damper as claimed in claim 14, wherein the cover plate is a metal sheet that is attached to the first ring and is open radially outwardly, wherein a wall of the cover plate is arranged parallel to a sealing portion of the sealing element at a distance from the sealing portion.

* * * * *